Dec. 11, 1956 J. TEERLINK 2,773,971
CHAINS AND THE LIKE
Filed Aug. 4, 1954
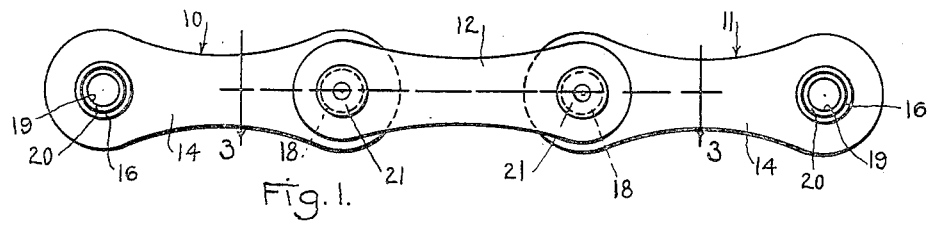
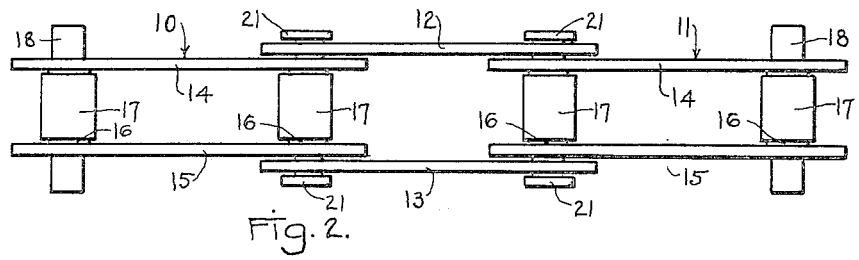
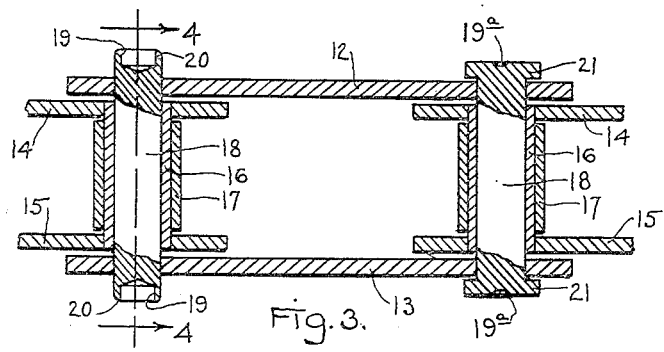 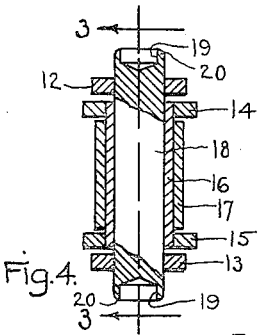
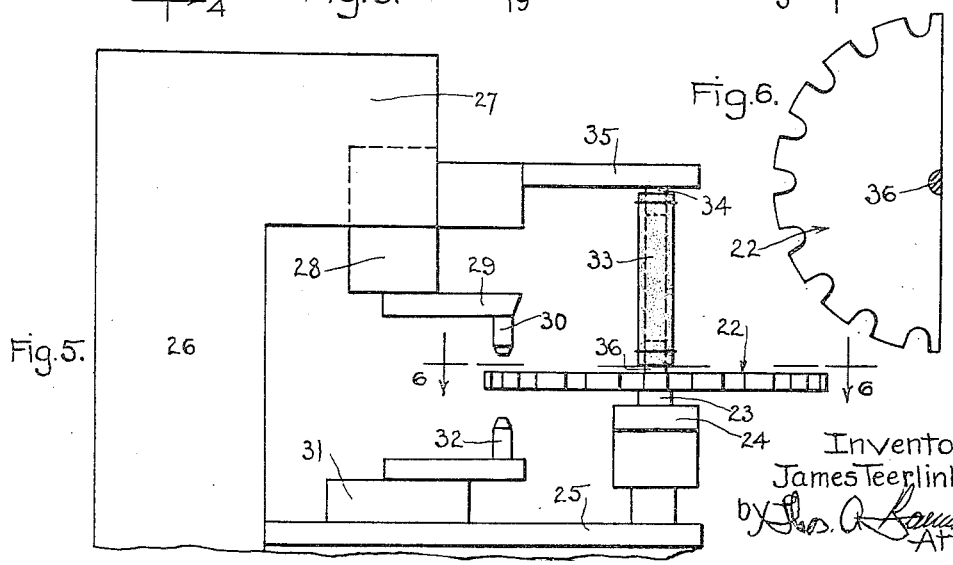 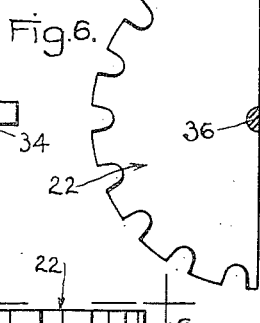
Inventor:
James Teerlink,

United States Patent Office 2,773,971
Patented Dec. 11, 1956

2,773,971

CHAINS AND THE LIKE

James Teerlink, Chicago, Ill., assignor to Chains, Inc., Dolton, Ill., a corporation of Illinois Application August 4, 1954, Serial No. 447,726

6 Claims. (Cl. 219—150)

This invention relates to improvements in chains, and the like. Particularly, the invention concerns itself with improvements in roller type chains, that is, chains in which rollers are provided on the cross bars, which rollers are engaged by the sprocket teeth when the chain is in use. The invention concerns itself particularly with the manner in which successive chain link sections are pivotally joined together so that bearing surfaces which are subjected to repeated rocking movements with respect to each other during running of the chain over the sprockets will be well able to withstand the wear occasioned by such running, and at the same time will not have excessive brittleness. To this end it is a prime object of the invention to provide pivotal connections between the successive link sections, which pivotal connections are of a high degree of hardness, but at the same time are of a comparatively low degree of brittleness.

The chains to which the present invention relates are formed of successive rectangular link sections which are of themselves rigid when assembled. Each such section includes two longitudinally extending side bars together with crosswise extending bushings extending between and rigidly connected to the proximate end portions of such side bars. Conveniently these bushings are press fitted into the side bars with sufficient tightness to withstand turning forces to which they are subjected during running of the chain over the sprockets, and to retain the side bars against lateral displacement on the bushings, that is, endwise of the bushings themselves. By this assembly each of the sections thus comprises a rigid rectangular unit; but during the assembling operation the rollers are set onto the bushings so that they occupy positions between the side bars when the assembly is completed. These rollers are free to rotate on the bushings, and are in length slightly less than the clearance between the proximate faces of the side bars, so that roller rotation is not interfered with and a free running chain unit is produced.

The spacing between the centers of the bushings of the unit is equal to the center to center spacing between the sprocket teeth with which the unit is to be used. Then successive such rectangular units are joined together by pairs of outside side bars whose end portions overlap and overlie the proximate end portions of the rectangular sections, the outside side bars being provided with openings which may be registered with the bushing openings so that cross pins may be and are set through the bushings and through such side bar openings, thus joining the successive rectangular sections together into the desired continuous chain length. The openings in the outside side bars are of a size to permit free rocking of the outside side bars on the pins, or said pins may be of rather tight fit in the openings of the outside side bars, since the pins are free to rock in the bushings. This latter construction is preferred, since thereby the pins and the outside side bars comprise other rigid rectangular sections pivotally connected to the first mentioned rectangular sections. In the case of such tight fitting of the pins into the outside side bars such pins may be of press fit into the outside side bars to produce the desired rigidity of the section.

These pins must be retained in position through the outside side bars and through the bushings, even when said pins are press fitted through the outside said bars. The means by which such retaining is effected comprises an important feature of my present invention, and I shall now explain the same, as follows:

I form a "hat" on each projecting end of each pin, such hat comprising an upset head on the end of the pin, and of a size greater than the pin's diameter, so that the pin cannot be withdrawn from the unit without destroying such hat. These hats are formed by a hot riveting operation, effected by an electrical contact resistance metal softening machine, but under conditions such that the main body of the pin is not damaged, and such that the free rocking of the pin within the bushing is not impaired after the hot riveting operation has been completed. To this end I provide each end of the pin with a counter-bore or counter-sink, leaving a rather thin annular rib projecting axially at the end of the pin. This counter-sink is of depth such that enough of the pin metal is left in the end portion of the pin to provide for the body of the hat to be produced by the hot riveting operation, under the condition that such hat shall be of a size to overlap the outside surface of the outside side bar, but without forcing the metal into contact with said outside side bar surface, thus leaving the outside side bar in its position of clearance from the inside side bar comprising a portion of the rectangular section first described. In other words, if, during the operation of producing the hats on the ends of a pin the operation were carried so far as to force the outside side bars themselves along the pins so as to bring said side bars into solid engagement with the outside surfaces of the inside side bars, it is evident that free rocking of the sections on the pins would be prevented. The hot riveting operation is so conducted that such clamping of the outside side bars against the inside side bars is avoided, and after the hats have been produced on the pins the successive sections are free to rock with respect to each other, the pins retaining fixed positions with respect to the outside side bars and rocking within the bushings which are themselves rigid with respect to the inside side bars of the pivoted section.

Now, during the hot riveting operation thus conducted by the contact metal softener, considerable heat is generated. The temperature developed in the thin annular rib around the counter-sink at each end of the pin must be sufficient to permit the metal of such rib to be compressed by the movement of the electrodes towards each other at the proper time, or after the lapse of the determined time interval, so as to form the hat under the desired conditions already explained. And yet the time interval above mentioned must not be sufficiently large to allow the heat to penetrate into the body of the pin and raise the temperature of such pin body high enough to seriously modify the specifications of the pin in a manner to impair the working qualities of the pin, and its ability to withstand serious wear or seriously shorten the effective life of the pin and chain. These impairments of the pin specifications are prevented when the operations are conducted according to my present invention, as follows:

When the pin is fitted into the outside side bars by a press fit, as already explained, and as is the preferred operation, it is evident that good heat conductivity between the end portion of the pin and the corresponding outside side bar is produced, so that a large portion of the heat developed during the hot riveting operation is carried away by the metal of such outside side bar and prevented from being conducted along the length of the pin to that portion of the pin which lies within the corresponding bushing. Due to this circumstance the temperature of the body of the pin within the bushing does not rise high enough to seriously impair the wearing qualities of such body portion of the pin, so that the wearing qualities of the pin and bushing rock joint are not seriously impaired; in fact said qualities are improved as will be evident from the following statement:

Extensive manufacturing operations producing chain embodying the features herein disclosed, and which operations have been conducted according to the disclosures herein set forth, have shown that when using pins originally of specifications including a hardness of 62 on the Rockwell scale ("C"), the hot riveting operations herein set forth reduce the hardness only to about 55 on said scale, but materially reduce the brittleness of the pin. Thus the hardness which is essential to ensuring desired wearing quality is not materially reduced, while at the same time the brittleness is materially reduced, thus greatly reducing breakages in service, which breakages are completely distinct from normal wear due to rocking and like wear producing movements under chain tension. It is also evident that when the hardness specification is of, say 55 on said scale, that is, the hardness to be provided in the pins of the completed chain, that specification requirement may be readily met by starting with a slightly higher hardness quality in the pins prior to the hot riveting operation, so that after such operation the pins will still retain the specified hardness of 55 on such scale. But I wish to emphasize the fact that by the operations herein disclosed the drop in the hardness during the hot riveting operation is small and is of controllable and previously known amount.

A further enhancing effect during the hot riveting operation is produced by the presence of the inside side bars which are press fitted to the end portions of the bushings. This effect is as follows:

As will presently appear, during the hot riveting operation the chain section or portion which includes a number of successive links, is strung onto the edge portion of a sprocket wheel having its teeth properly spaced to comply with the requirements of the chain being treated, and of thickness to nicely accommodate the lateral spacing between the two inside side bars of each pair. Thus heat which may be conducted along the pin to locations inside of the outside side bars—that is, to locations closer to the longitudinal center line of the chain than said outside side bars—will be transmitted by the pin to the bushing engaged by the pin, and by such bushing to the inside side bars. Thus, a further and very effective heat flow stoppage is provided to protect the pin against rise of temperature in its portions which lie within the bushing proper, and which portions will subsequently be called on to transmit the tensile loads between the pin and the bushing when the chain is in service. Thus a most effective protection is provided to ensure against undesired and unpredicted lowering of the hardness of the pin during the hot riveting operations. I shall hereinafter describe and illustrate a simple construction of electrical hot riveting contact resistance unit by which these operations are produced.

Other objects and uses of the invention will appear from a detailed description of the same, which consists in the features of construction, and combinations of parts hereinafter described, and claimed.

In the drawings:

Figure 1 shows a side view of a length of chain embodying the features of my present invention, the chain length illustrated including two of the rectangular sections which include the press fitted bushings, together with the outside side bars which join such sections together;

Figure 2 shows a top view corresponding to Figure 1;

Figure 3 shows a longitudinal section taken on the line 3—3 of Figures 1 and 4, looking in the directions of the arrows, Figure 3 being on enlarged scale as compared with Figures 1 and 2;

Figure 4 shows a cross-section taken on the line 4—4 of Figure 3, looking in the direction of the arrows;

Figure 5 shows schematically a hot riveting electrical contact weld machine set-up by which the hot riveting of the pin ends may be produced according to the disclosures of the present application, and includes the sprocket wheel on which the chain length is strung during the hot riveting operations; and Figure 6 shows a half-segment of the sprocket wheel referred to hereinbefore.

Referring first to Figures 1 and 2, I have therein shown the two rectangular sections 10 and 11, together with the connecting outside side bars 12 and 13. The construction of the typical rectangular section 12 is shown in detail in Figures 3 and 4, it being noted that Figure 3 shows the end portions of two such rectangular sections, together with the complete connecting links. Furthermore, in Figure 3 I have shown one of the pins set through the bushing and through the two connecting links prior to the hot riveting operation, and the other pin thus shown has been hot riveted to produce the hats on its ends.

Each rectangular section includes the two side bars 14 and 15. A bushing 16 is set through companion holes in the proximate ends of the two bars 14 and 15; and preferably the bar holes are of size requiring a press fit setting of the bushing into place. The bushing is of a length such that when the two bars are pressed onto it to bring the outer faces of such bars flush with the bushing ends the bars are spaced from each other the desired and specified distance. By reason of such press fit the two bushings hold the inner side bars firmly against normal rocking movements, and thus the two bars, together with the two bushings provide a rigid rectangular section. The roller 17 is set onto the bushing prior to the pressing of the side bars into place, and the length of such roller is such that when the two bars have been pressed into home positions as already explained the roller will not bind against the inside faces of the side bars. Thus while the two side bars are rigidly connected to the bushing at each end of the rectangular section, both of the rollers are free to rotate on the bushings.

It will be understood that the foregoing operations have been executed without the presence of the pins. Having completed the assembly of the rectangular sections in this manner the pins 18 are set through the bushings, leaving their ends projecting substantially equal distances beyond the faces of the inner side bars (being also the ends of the bushings). The two outside side bars 12 and 13 are then set onto the projecting end portions of the pins 18, it being desirable that the holes of such outside side bars also require a pressing operation to bring said side bars into place. (In Figure 3 the right-hand pin 18 is shown as being provided with a hat on each end, but these hats are produced after the outside side bars have been set onto the plain ends of the pins.) During the pressing of the outside side bars into place they are set onto the pins only far enough to leave slight clearances between the inner faces of such outside side bars and the outer faces of the inner side bars, as shown in Figure 3.

The end portions of the pins are provided with the counterbores 19 which extend endwise into the pins about as far as the outer faces of the outside side bars, as shown in Figure 3. These counterbores are of diameter to leave the relatively thin annular flanges 20 at the ends of the pins. By slightly rounding the outer ends of the pins, providing them with outside fillets as shown, these counterbores will produce sharp edges at the outer ends of the flanges, thus materially reducing the contacting surfaces which will be engaged by the welding electrodes during the institution of the hot riveting operation, presently to be described. It is here noted that by the provision of these thin annular flanges at the pin ends the heat developed during the hot riveting operation will flow through these flanges and be delivered to the outer surface portion of the pin as far as the outside side bars 12 and 13, and by reason of the press fits of these side bars onto the pin good heat conductivity will be found at the location of each such side bar. Thus the bulk of the conducted heat will be delivered directly to the side bar, by a short route of travel. Due to the relatively large exposed surface of such side bar rapid dissipation of such heat will occur, with consequent rapid lowering of temperature, so that comparatively little heat will be transferred through the pin to pin locations closer to the longitudinal axis of the chain. However, although the pin is not press fitted into the bushing, being free to rotate within such bushing, still sufficient contact will occur between the pin and the bushing to ensure a further transfer of heat from the pin to the bushing end, and thence to the inner side bar. There a further dissipation of heat will occur due to the large exposed surface of such side bar, so that a further substantial lowering of pin temperature will occur before that portion of the pin substantially within the bushing is reached. Accordingly, that portion of the pin which carries the bulk of the tensile load when the chain is in service will not be subjected to a sufficiently high temperature to materially lower the hardness of such working portion of the pin, as I have already pointed out herein.

It is noted that the hot riveting operation should be so conducted that the hat 21 will be formed on each end of the pin. This result is obtained by bringing the two electrodes of the hot forming machine into engagement with the two ends of the pin, and, after the ends of the pin attain the desired metal softening temperature the electrodes are moved towards each other under controlled pressure and distance, to thus force the softened material of the annular pin end flange outwardly into the form shown at the right-hand side of Figure 3 in particular, without compressing the material against the outer surface of the outside side bar. Thus the side bars 12 and 13 are left free of the pin hats 21, and they are also free of the outside surfaces of the inside side bars 14 and 15, as shown in Figure 3. Examination of that figure also shows that the operation has used substantially all of the annular flange in the formation of the hat, so that only a slight portion of the counterbore remains evident after the riveting operation.

Reference may now be had to Figures 5 and 6 which show, more or less schematically, a convenient electrical welding unit by which the hats may be formed. In Figure 5 the turntable 22 comprises a sprocket wheel having teeth of pitch the same as that of the chain to be produced; and this sprocket wheel is of thickness in its peripheral portion the same as the clearance between the inside side bars 14 and 15. Thus, by assembling a section or length of chain in partially completed condition it may be set onto the teeth of this sprocket wheel for further treatment. This partial assembly comprises the completion of the rectangular sections and the insertion of the pins through the bushings, and the pressing of the outside side bars into correct position on the exposed end portions of the pins. This condition is shown at the left-hand end of Figure 3. At this point it remains to produce the hats on the exposed end portions of the pins; and the setting of the so-far completed chain length onto the sprocket teeth is the first step in this operation.

The sprocket wheel is carried by a stud 23 journalled at 24 to a bracket 25 carried by the stand 26. This stud may be spring pressed upwardly slightly to normally retain the sprocket wheel turntable in a slightly elevated position as shown in Figure 5. Such spring may be contained in the journal element 24.

The stand 26 carries another bracket 27 at a higher elevation than the turntable sprocket wheel. The vertical slide unit 28 is tracked to this bracket 27 so that it may be forced down under hydraulic pressure by a controlled hydraulic fluid supply (not shown). The lower end of this slide unit carries the outwardly projecting arm 29 which carries the upper electrode 30 in position to engage the upper counterbored end of a registering one of the chain pins 18 when the turntable has been brought to correct position by rotation. The lower bracket 25 carries a block 31 which in turn carries the lower electrode 32 in vertical alignment with the electrode 30, and in position to receive the lower counterbored end of the pin 18 previously referred to. The turntable sprocket wheel is held in raised position by the section of elastic hose, such as a fabric embedded rubber hose, 33. The upper end of this section of hose is clamped to a stud 34 carried by a bracket 35 which extends out from the bracket 27; and the lower end of this hose is clamped to a short stud 36 which extends up from the center of the sprocket wheel. It will be understood that this hose length acts as a tension member additional to the previously mentioned spring within the bearing element 24, to raise the sprocket wheel; but it is well known that such fabric embedded rubber hose as previously referred to has a high "internal resistance," so that its elastic action is relatively sluggish. Thus, when the operation presently to be described has been completed, and the sprocket wheel is to be allowed to rise such rising action will be comparatively slow, and in fact a retarding rise will occur, thus preventing any sudden shock at the terminus of the rise.

Having brought the sprocket wheel around to position of registry of the upper and lower pin ends with the electrodes hydraulic pressure is allowed to act on the slide block 28, forcing it down far enough to carry the upper electrode into engagement with the upper pin end. Further downward forcing of such slide block will press against the upper pin end, thus also pressing down on the chain and the sprocket wheel, and stretching the hose section 33. This lowering of the sprocket wheel will be guided by the bearing element 24 so that presently the lower end of the pin will come into engagement with the lower electrode 32. Slight further downward forcing of the block 28 will, when caused, produce the desired lateral enlargement of the exposed pin ends, thus producing the desired hats on said pin ends. If needed a slight pause in the downward forcing operation may be provided for to allow the pin ends to attain the proper temperature prior to completing the downward forcing movement of the block 28. Provision may be made for discontinuing the current supply after such compressing and forming operation has been completed, and slightly prior to allowing the slide block 28 to again rise. I have not herein disclosed the details of the welding machine, as various forms of such machines capable of performing the operations just explained are well known in the welding art.

Having completed the hat forming operation on one of the pins, and permitted the block 28 to rise, the sprocket wheel may be rotated sufficiently to bring the next pin into registry with the electrodes, and the operation may then be repeated, etc.

It may be pointed out that by providing the sprocket wheel of a thickness to receive the inner side bars 14 and 15 with a close fit, good heat conductivity will be provided between said side bars and the sprocket wheel, thus ensuring a substantial drainage of heat from such side bars into the wheel and materially aiding in holding down the temperature of the pin portions lying at the location of the bearing bushing. I have provided such sprocket wheels formed of bronze with excellent results in the formation of the hats on the pins.

I claim:

1. A method of producing a length of roller chain which chain comprises a series of rigid rectangular sections each composed of a pair of parallel oppositely disposed inside side bars spaced apart a distance to accommodate the toothed peripheral portion of a sprocket wheel, and a hollow bushing at each end of such rectangular section and extended through openings of said inside side bars to the outside surfaces of such inside side bars each bushing having a journal opening of substantially uniform diameter throughout the length of such bushing, and a roller freely journalled on each bushing between the inside side bars of such section, together with a pin extended through and journalled in each bushing and projecting beyond the outside surfaces of the inside side bars of the corresponding rectangular section and having bearing contact with the bushing throughout substantially the entire length of the bushing, and outside side bars having their end portions provided with openings to receive the projecting pin portions and rigidly connected to said projecting portions of proximate pins of successive rectangular sections and connecting said sections together, which method comprises setting the end portions of the bushings into openings in the end portions of the inside side bars with press fits and with a roller in journal position on each bushing, thereafter setting the end portions of the outside side bars onto the projecting pin portions with press fits, and thereafter engaging the opposite ends of each pin by electrodes of a source of current supply and subjecting said electrodes to pressure against the pin ends, to thereby heat the pin ends by contact resistance to current flow to soften said pin ends and compress them towards each other and towards the outside surfaces of the proximate outside side bars for enlargement of said pin ends laterally into enlarged heads at locations outside of the outside side bars.

2. A method as defined in claim 1, wherein the heat produced in the end portions of the pins flows to the press fitted proximate outside side bar portions and is conducted by said outside side bars away from the pins and is dissipated to large extent by said outside side bars.

3. A method as defined in claim 1, wherein the pins are initially of hardness of substantially 62 "C" on the Rockwell scale of hardness prior to the hot riveting operation, and wherein said pins are of hardness of substantially 55 "C" on the Rockwell scale of hardness after the hot riveting operation.

4. A method as defined in claim 2, wherein the pins are initially of hardness of substantially 62 "C" on the Rockwell scale of hardness prior to the hot riveting operation, and wherein said pins are of hardness of substantially 55 "C" on the Rockwell scale of hardness after the hot riveting operation.

5. A method as defined in claim 1, wherein the heat produced in the end portions of the pins flows to the end portions of the bushings in journal contact with the pins and into the end portions of such bushings, and flows from such end portions of the bushings to the press fitted proximate inside side bar portions and is conducted by said inside side bars away from the bushings and is dissipated to a large extent by said inside side bars.

6. A method as defined in claim 5, wherein the inside bars are in heat transmitting contact with the side faces of a sprocket wheel, and wherein heat coming to said inside side bars is transmitted to such sprocket wheel for dissipation thereby.

References Cited in the file of this patent
UNITED STATES PATENTS

| | | |
|---|---|---|
| 921,519 | Dodge | May 11, 1909 |
| 1,527,797 | Harrison | Feb. 24, 1925 |
| 1,584,793 | Morehead et al. | May 18, 1926 |
| 1,587,445 | Thomson | June 1, 1926 |
| 1,873,619 | Mojonnier | Aug. 23, 1932 |
| 2,431,702 | McCann | Dec. 2, 1947 |
| 2,463,669 | Wright | Mar. 8, 1949 |
| 2,568,649 | McIntosh et al. | Sept. 18, 1951 |